United States Patent
Olofsson et al.

(10) Patent No.: US 8,275,822 B2
(45) Date of Patent: Sep. 25, 2012

(54) MULTI-FORMAT MULTIPLIER UNIT

(75) Inventors: Andreas D. Olofsson, Lexington, MA (US); Baruch Yanovitch, Ranana (IL)

(73) Assignee: Analog Devices, Inc., Norwood, MA (US)

( * ) Notice: Subject to any disclaimer, the term of this patent is extended or adjusted under 35 U.S.C. 154(b) by 1202 days.

(21) Appl. No.: 12/008,335

(22) Filed: Jan. 10, 2008

(65) Prior Publication Data

US 2008/0195685 A1    Aug. 14, 2008

Related U.S. Application Data

(60) Provisional application No. 60/879,678, filed on Jan. 10, 2007.

(51) Int. Cl.
*G06F 7/52* (2006.01)
(52) U.S. Cl. .................. 708/620; 708/628; 708/629
(58) Field of Classification Search .................. None
See application file for complete search history.

(56) References Cited

U.S. PATENT DOCUMENTS

| | | | | | |
|---|---|---|---|---|---|
| 4,354,249 | A | * | 10/1982 | King et al. | 708/622 |
| 4,546,446 | A | * | 10/1985 | Machida | 708/627 |
| 4,843,585 | A | * | 6/1989 | Williams | 708/627 |
| 4,989,168 | A | * | 1/1991 | Kuroda et al. | 708/210 |
| 5,170,411 | A | * | 12/1992 | Ishigaki | 375/147 |
| 5,297,070 | A | * | 3/1994 | Hua et al. | 708/404 |
| 5,586,070 | A | * | 12/1996 | Purcell | 708/620 |
| 5,896,543 | A | * | 4/1999 | Garde | 712/35 |
| 7,024,444 | B1 | * | 4/2006 | Green | 708/620 |
| 7,266,579 | B2 | * | 9/2007 | Dupaquis et al. | 708/620 |

* cited by examiner

*Primary Examiner* — Lewis A Bullock, Jr.
*Assistant Examiner* — Christine Dang
(74) *Attorney, Agent, or Firm* — Bingham McCutchen LLP

(57) ABSTRACT

Multiplication engines and multiplication methods are provided. A multiplication engine for a digital processor includes a first multiplier to generate unequally weighted partial products from input operands in a first multiplier mode; a second multiplier to generate equally weighted partial products from input operands in a second multiplier mode; a multiplexer to select the unequally weighted partial products in the first multiplier mode and to select the equally weighted partial products in the second multiplier mode; and a carry save adder array configured to combine the selected partial products in the first multiplier mode and in the second multiplier mode.

19 Claims, 9 Drawing Sheets

FIG. 3B

| $a_7b_0$ | $a_7b_1$ | $a_7b_2$ | $a_7b_3$ | $a_7b_4$ | $a_7b_5$ | $a_7b_6$ | $a_7b_7$ |
| --- | --- | --- | --- | --- | --- | --- | --- |
| $a_0b_0$ | $a_0b_1$ | $a_0b_2$ | $a_0b_3$ | $a_0b_4$ | $a_0b_5$ | $a_0b_6$ | $a_0b_7$ |

122

MULTI-FORMAT MULTIPLIER UNIT

CROSS REFERENCE TO RELATED APPLICATION

This application claims priority based on Provisional Application Ser. No. 60/879,678 filed Jan. 10, 2007, which is hereby incorporated by reference in its entirety.

FIELD OF THE INVENTION

This invention relates to digital signal processors and, more particularly, to a multi-format multiplier unit.

BACKGROUND OF THE INVENTION

Advanced wireless networks require significant hardware acceleration in order to perform functions such as beamforming and path searching. To address these data processing requirements, CDMA systems often implement these algorithms directly with a dedicated ASIC or an on-chip coprocessor unit. Although this approach offers the highest potential performance, it carries significant design risks and is very inflexible to changes in standards and algorithms.

These and other algorithms usually involve multiplication operations. Wireless processing requires complex algorithms such as path search, matrix multiplication and FIR filters. Due to the area and power requirements for acceleration hardware to implement these algorithms, hardware sharing is a consideration in designing such systems.

Accordingly, there is a need for improved multipliers and multiplication methods.

SUMMARY OF THE INVENTION

The invention provides multiplication engines for a digital processor and multiplication methods in which at least two multiplication functions are performed by the same hardware, thereby saving chip area.

According to a first aspect of the invention, a multiplication engine for a digital processor comprises a first multiplier to generate unequally weighted partial products from input operands in a first multiplier mode; a second multiplier to generate equally weighted partial products from input operands in a second multiplier mode; a multiplexer to select the unequally weighted partial products in the first multiplier mode and to select the equally weighted partial products in the second multiplier mode; and a carry save adder array configured to combine the selected partial products in the first multiplier mode and in the second multiplier mode.

According to a second aspect of the invention, a method is provided for multiplication in a digital processor. The method comprises generating unequally weighted partial products in a first multiplier mode; generating equally weighted partial products in a second multiplier mode; selecting the unequally weighted partial products in the first multiplier mode and the equally weighted partial products in the second multiplier mode; and combining the selected partial products in a carry save adder array in the first multiplier mode and in the second multiplier mode.

BRIEF DESCRIPTION OF THE DRAWINGS

For a better understanding of the present invention, reference is made to the accompanying drawings, which are incorporated herein by reference and in which:

FIG. 3B is a schematic diagram that illustrates equally weighted partial product vectors;

DETAILED DESCRIPTION

Figure 1:
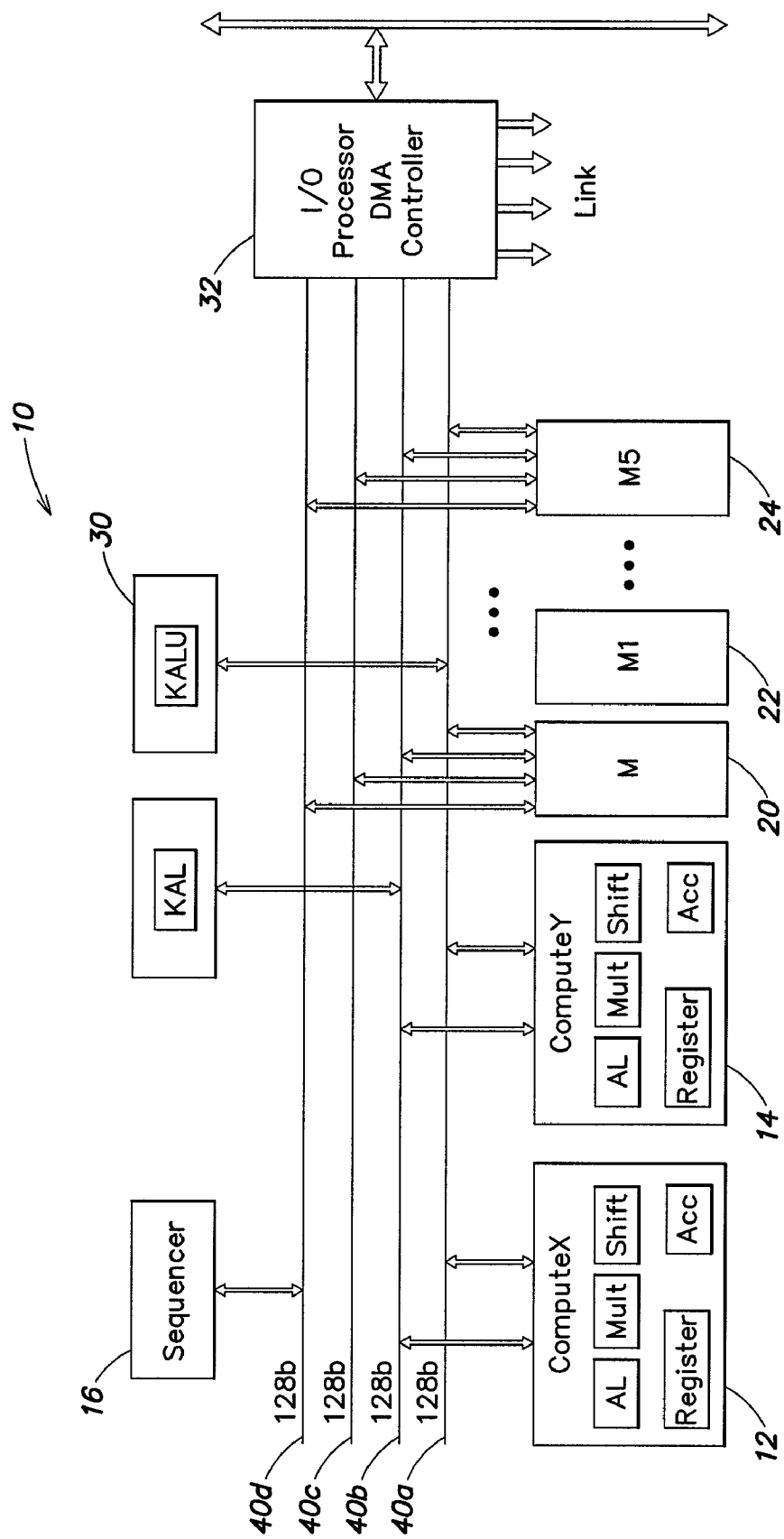
FIG. 1 is a block diagram showing an example of a digital signal processor architecture.

A block diagram of an example of a digital signal processor (DSP) 10 suitable for incorporation of the present invention is shown in FIG. 1. The digital signal processor may be the TigerSharc digital signal processor manufactured and sold by Analog Devices, Inc., Norwood, Mass., for example. The digital signal processor 10 may include a compute X block 12, a compute Y block 14, an instruction sequencer 16, memory blocks 20, 22, 24, an integer ALU 30 and an I/O processor or DMA controller 32. The elements of DSP 10 are interconnected by data and address buses 40a, 40b, 40c and 40d.

Figure 2:
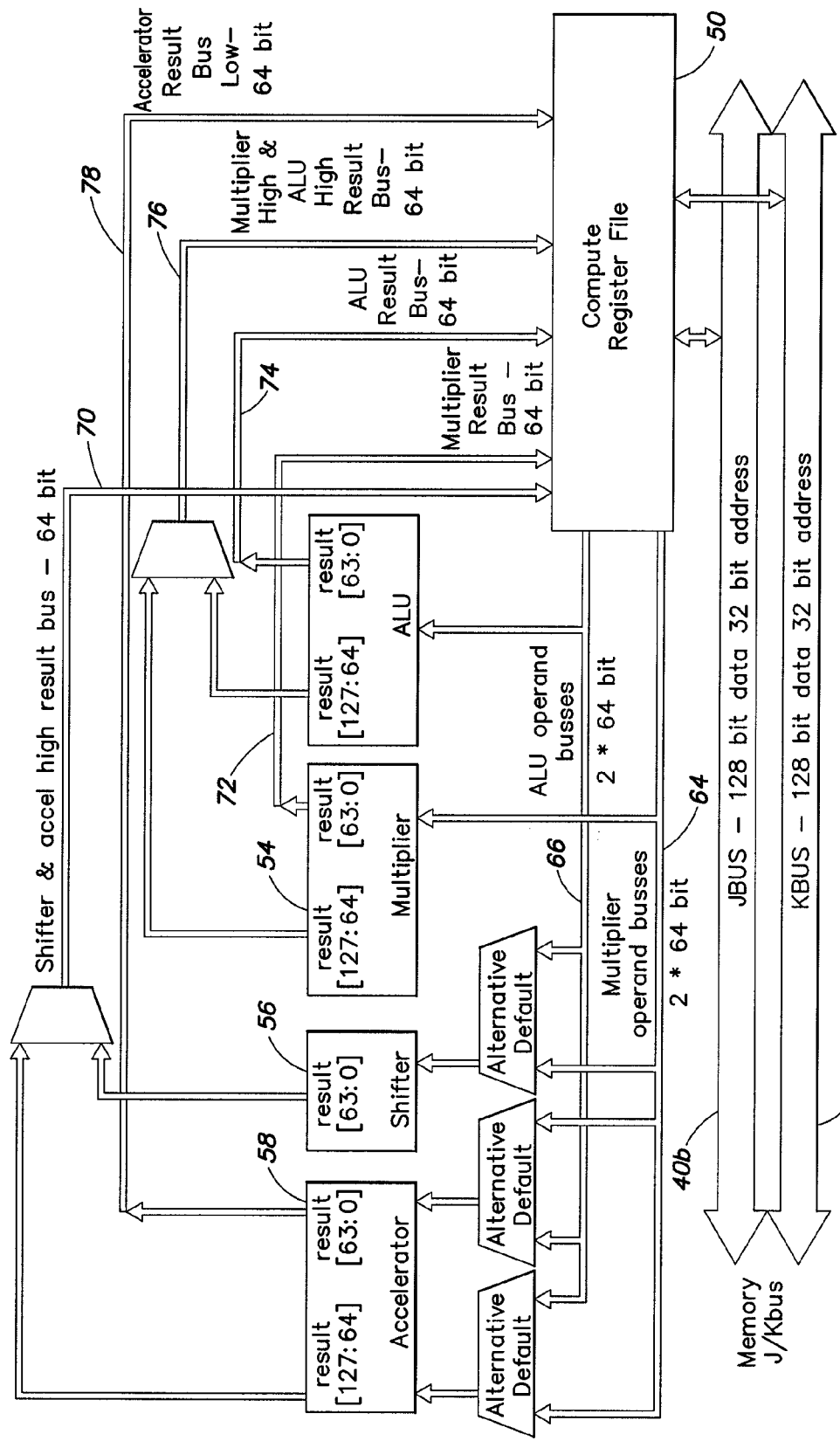
FIG. 2 is a block diagram showing an example of a compute block in the digital signal processor.

An example of compute blocks 12 and 14 is shown in FIG. 2. The compute block includes a compute register file 50 and several computation units. The computation units include an ALU 52, a multiplier 54, a shifter 56 and an accelerator 58. Compute register file 50 receives data on buses 40a and 40b and supplies operands to the computation units on operand buses 64 and 66. The results of the computations are supplied on result buses 70, 72, 74, 76 and 78 to compute register file 50. The results may be written to memory from compute register file 50 or supplied to the computation units for subsequent computations.

Figure 3:
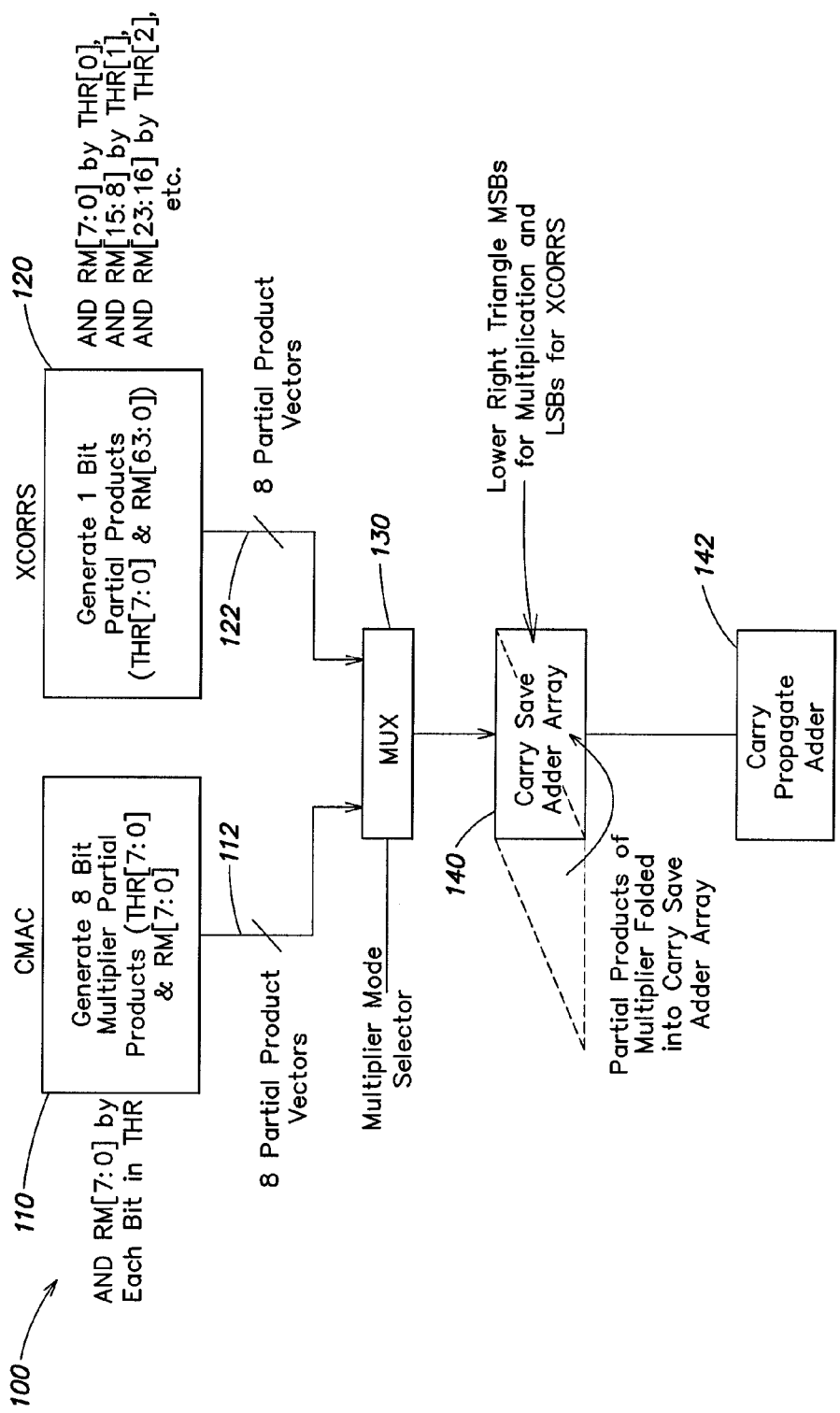
FIG. 3 is a schematic block diagram that illustrates a multi-format multiplier in accordance with an embodiment of the invention.

A block diagram of a multi-format multiplier unit 100 in accordance with an embodiment of the invention is shown in FIG. 3. Multiplier 100 may correspond to multiplier 54 shown in FIG. 2, may be used in accelerator 58, or both. A first multiplier circuit 110 performs complex multiplication and generates unequally weighted partial products 112. For example, in a matrix multiplication algorithm, multiplier circuit 110 may multiply two 16-bit complex numbers, each including 8 bits real and 8 bits imaginary. In this example, unequally weighted partial products 112 include eight partial product vectors, each of 8 bits.

Figure 3A:
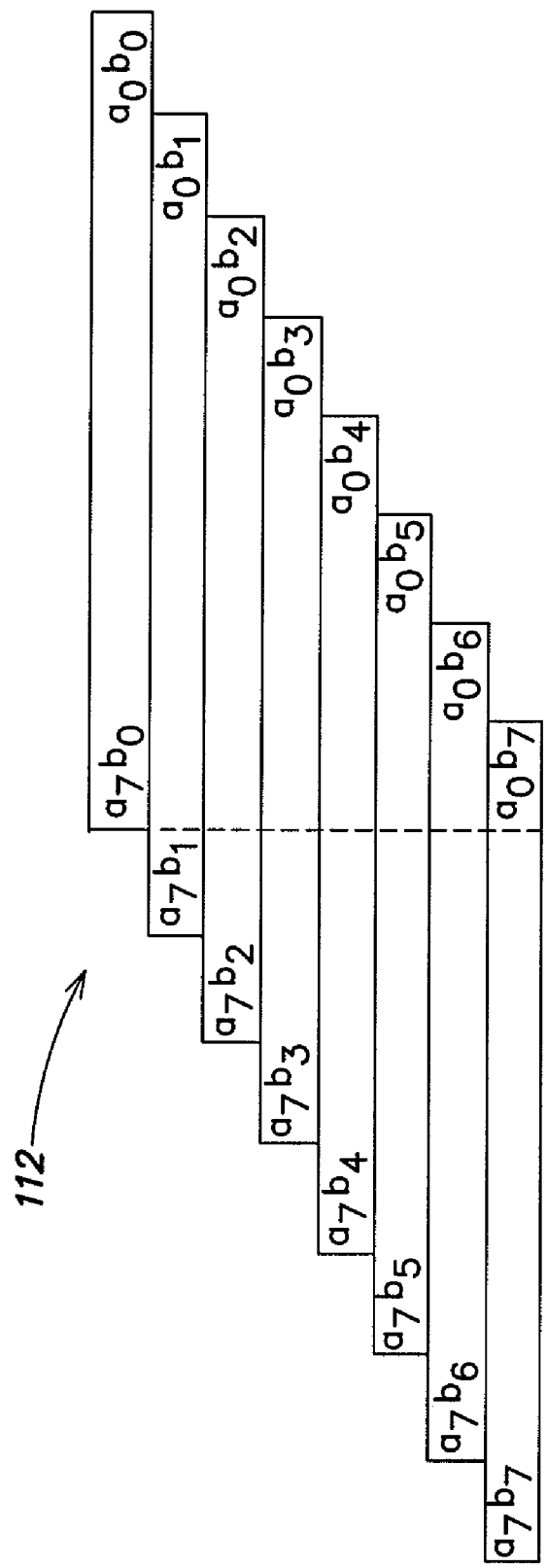
FIG. 3A is a schematic diagram that illustrates unequally weighted partial product vectors.

An example of unequally weighted partial products 112, including eight partial product vectors, is shown in FIG. 3A. The partial products represent the multiplication of two 8-bit operands $[a_7:a_0]$ and $[b_7:b_0]$, where the bits of both operands are weighted. Because both operands are weighted, the partial product vectors are unequally weighted relative to each other. In FIG. 3A, the partial product vectors are offset so that partial products of equal weight are vertically aligned. The multiplier 110 may be implemented as an array of two-input AND gates which logically combine each bit pair of the two operands to provide partial products as shown in FIG. 3A.

A second multiplier circuit 120 performs complex multiplication and generates equally weighted partial products 122. For example, in a path search algorithm, multiplier circuit 120 may multiply a 16-bit complex data value, including 8 bits real and 8 bits imaginary, by a 2-bit complex coefficient, including 1 bit real and 1 bit imaginary. The equally weighted partial products 122 may include eight partial product vectors, each of 8 bits, which are equally weighted relative to each other.

An example of equally weighted partial products 122, including eight partial product vectors, is shown in FIG. 3B. The partial products represent the multiplication of an 8-bit operand $[a_7:a_0]$ by eight values of a single bit operand $[b_n]$, where n=0-7. The bits of the 8-bit operand are weighted, but the values of the single bit operand have equal weights. A calculation of this type is typical of despreading operations performed in CDMA wireless communication systems. In FIG. 3B, the partial product vectors are aligned so that partial products of equal weight are vertically aligned. The multiplier 120 may be implemented as an array of two-input AND gates which logically combine each bit pair of the two operands to provide partial products as shown in FIG. 3B. The partial product vectors have equal weights relative to each other.

Multiplier unit 100 further includes a multiplexer 130 which receives unequally weighted partial products 112 and equally weighted partial products 122. A multiplier mode selector signal causes multiplexer 130 to select one of the sets of partial product vectors in accordance with the multiplier operating mode. The outputs of multiplexer 130 are supplied to a carry save adder array 140 which combines the selected partial products. The output of carry save adder array 140 is supplied to a carry propagate adder 142.

Figure 4:
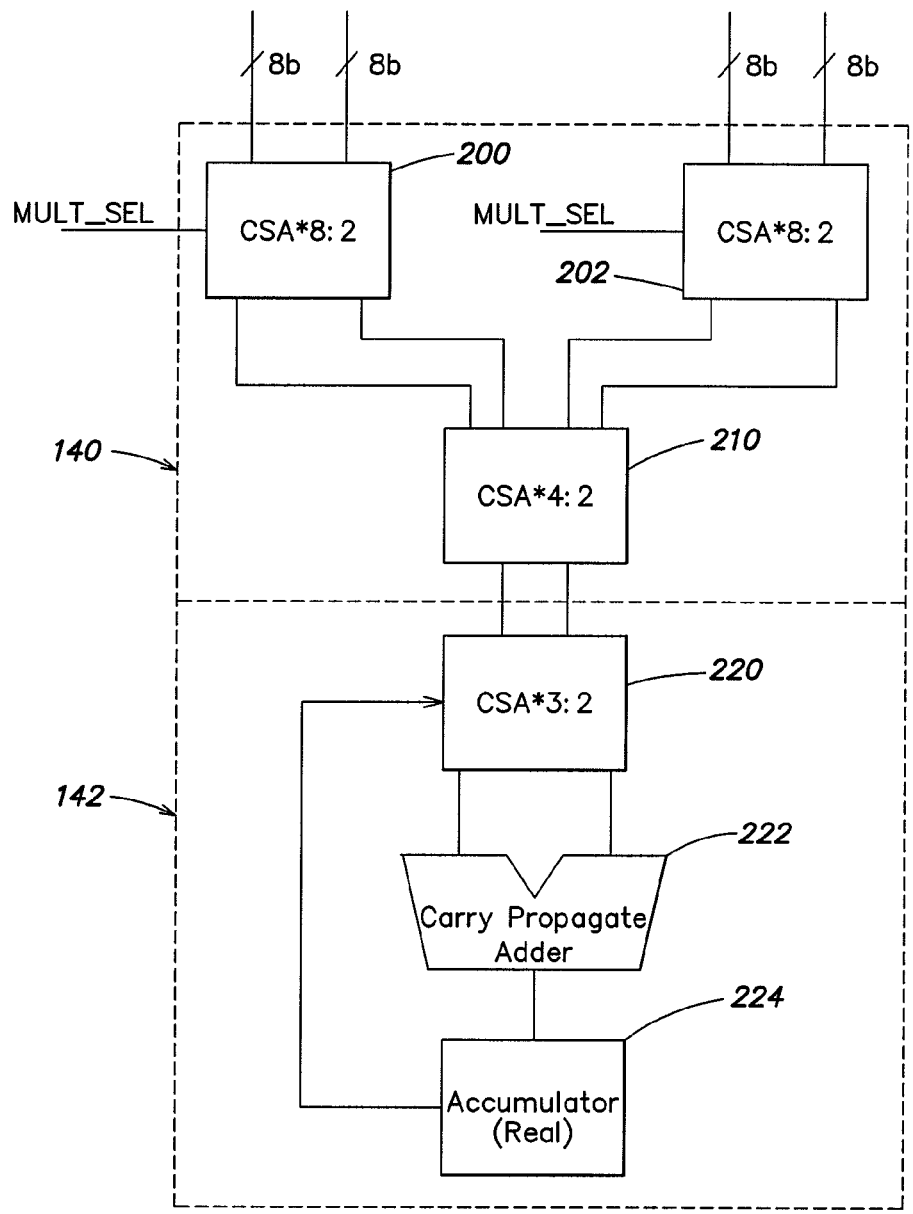
FIG. 4 is a block diagram of the carry save adder array and carry propagate adder shown in FIG. 3.

The carry save adder array 140 and the carry propagate adder 142 are shown in greater detail in FIG. 4. By folding over the higher order bits of the unequally weighted partial products in the standard multiplier, virtually all carry save adders can be shared between the two operating modes. In order to share the carry save adders, carry paths in the carry save adder array are cut using propagation disabling multiplexers. In addition, the carry propagate adder 142 can be reused in the two operating modes.

An embodiment of carry save adder array 140 and carry propagate adder 142 is shown in FIG. 4. The embodiment of FIG. 4 is configured to calculate the real part of a complex multiplication. In particular, the carry save adder array 140 shown in FIG. 4 performs two 8-bit by 8-bit (8×8) multiplications and subtracts the two results to provide the real part of the complex product. A similar carry save adder array and carry propagate adder are utilized to calculate the imaginary part of the complex product.

Figure 5:
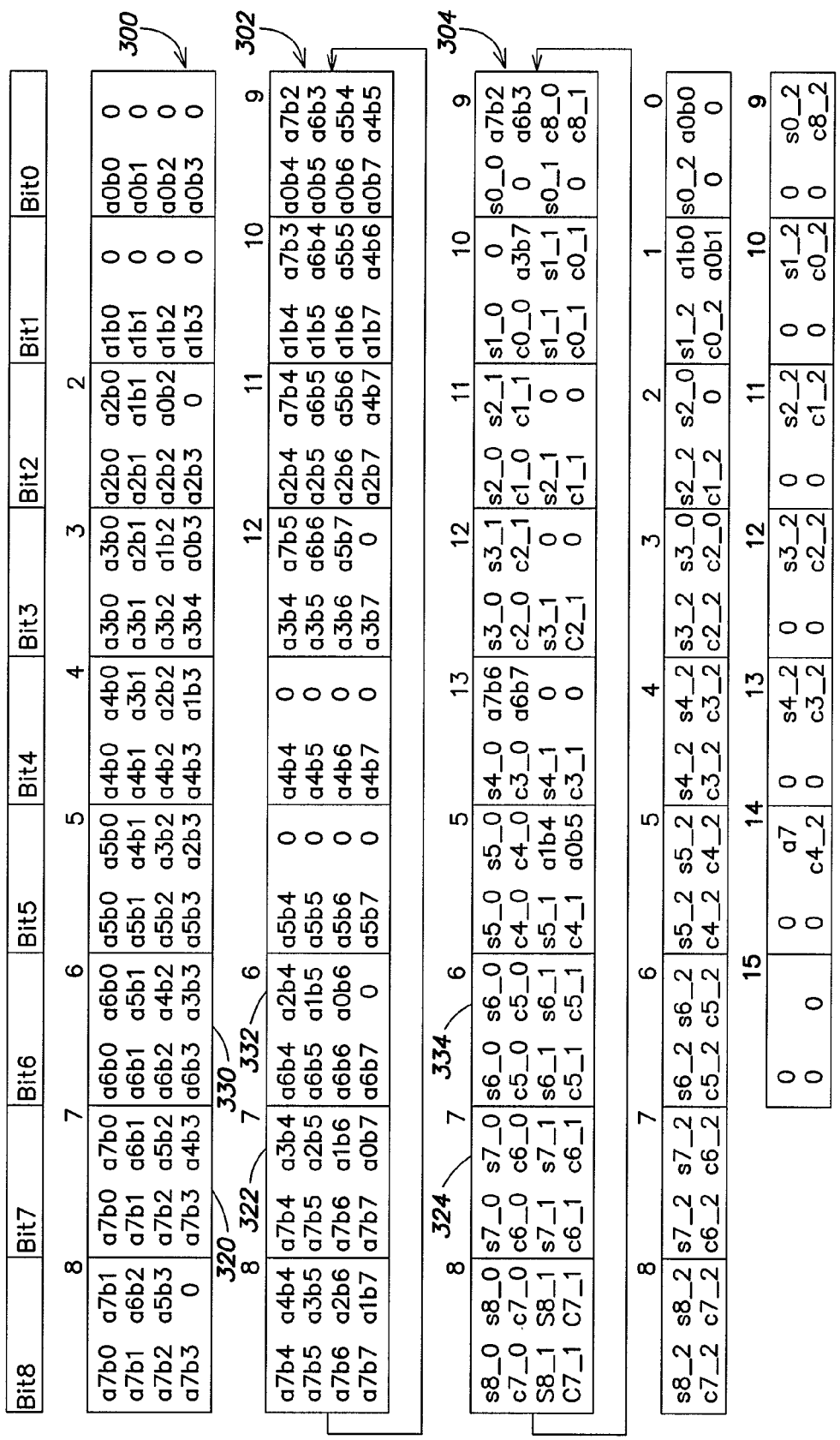
FIG. 5 is a table that illustrates the construction and operation of the carry save adder array of FIG. 4.
Figure 6:
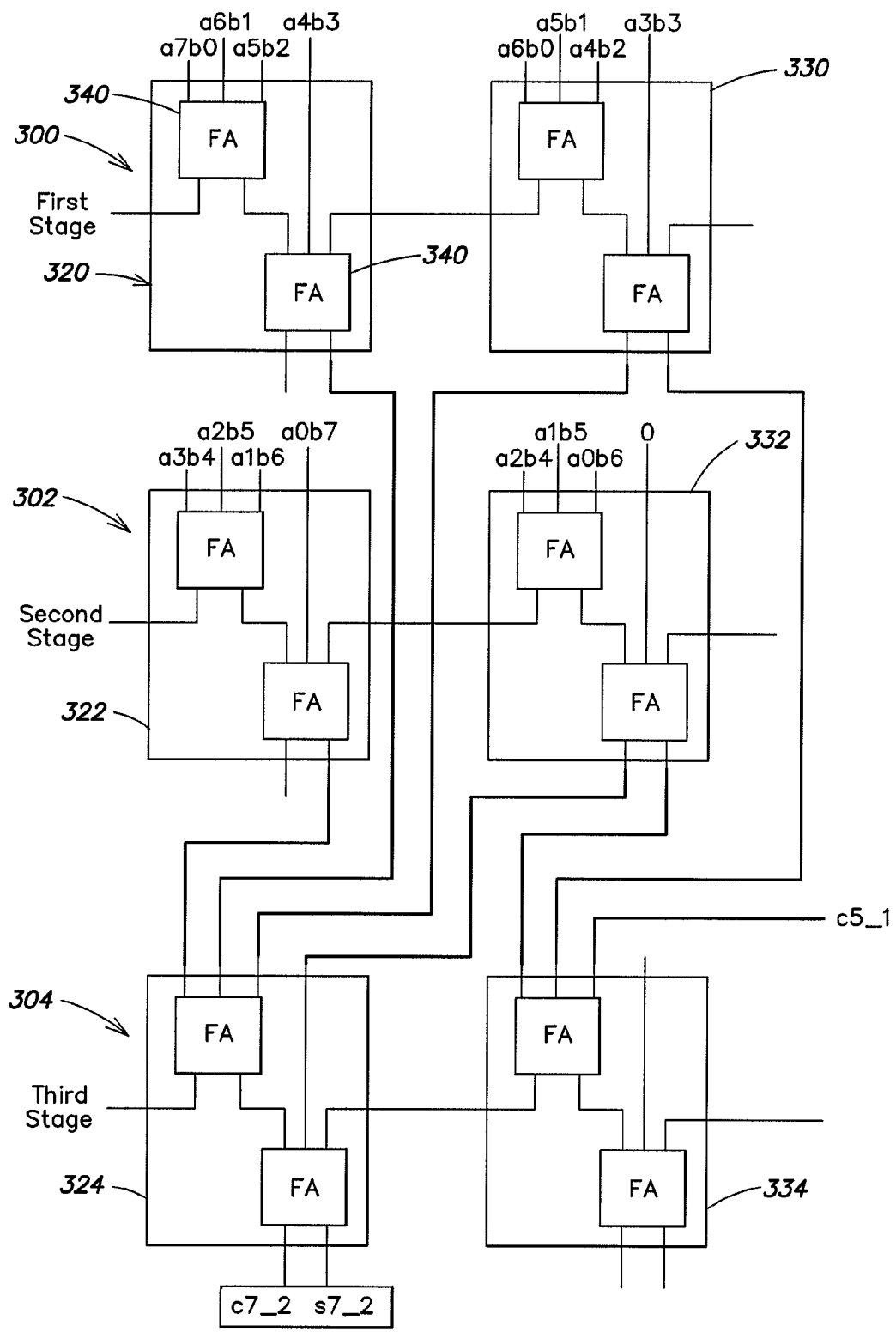
FIG. 6 is a schematic block diagram of one cell of each of the first, second and third sets of carry save adders shown in FIG. 5.

Referring to FIG. 4, carry save adder array 140 includes a first 8:2 carry save adder (CSA) 200 and a second 8:2 carry save adder 202. The outputs of carry save adders 200 and 202 are provided to a 4:2 carry save adder 210. The 8:2 carry save adders 200 and 202 each combine eight inputs into two outputs, and the 4:2 carry save adder 210 combines four inputs into two outputs. As shown in FIGS. 5 and 6 and described below, each of the 8:2 carry save adders may be implemented using three 4:2 carry save adders.

In some embodiments, the carry save adder array 140 is required to perform a single 8×8 multiplication rather than two 8×8 multiplications. In such embodiments, 8:2 carry save adder 202 and 4:2 carry save adder 210 can be omitted and the outputs of 8:2 carry save adder 200 can be connected to the inputs of carry propagate adder 142.

As further shown in FIG. 4, carry propagate adder 142 includes a 3:2 carry save adder 220, a carry propagate adder 222 and an accumulation register 224. The 3:2 carry save adder 220 combines the current output of carry save adder array 140 with the previous result stored in accumulation register 224 and provides outputs to carry propagate adder 222. The carry propagate adder 222 combines the outputs of 3:2 carry save adder 220 and provides a new result to accumulation register 224.

A table that illustrates the construction and operation of 8:2 carry save adder 200 is shown in FIG. 5. The 8:2 carry save adder 202 can have the same construction and operation, with appropriate changes of inputs. The table of FIG. 5 illustrates how the 8:2 carry save adder 200 combines eight partial product vectors, each of 8 bits, in the multiplier mode (unequally weighted partial products) and in the despread mode (equally weighted partial products). In FIG. 5, rows 1-4 represent the operation of a first 4:2 carry save adder 300, rows 5-8 represent the operation of a second 4:2 carry save adder 302 and rows 9-12 represent the operation of a third 4:2 carry save adder 304. The outputs of 4:2 carry save adder 300 and 4:2 carry save adder 302 are combined by 4:2 carry save adder 304 to provide an overall compression from eight inputs to two outputs. Each carry save adder 300, 302, 304 includes nine bits to account for sign extension.

The table of FIG. 5 can be viewed as representing three stages of carry save adders, where CSA 300 is stage 0, CSA 302 is stage 1 and CSA 304 is stage 2. The "_0" suffix in the CSA input column represents the output of stage 0. The "_1" suffix in the CSA input column represents the output of stage 1. The first number in the input column of the third stage represents the bit number in a specific stage. Note that the carry output has two times the binary weight of the sum output, so the third stage adds s7_0, c6_0, s7_1, and c6_1, for example. In cases where the two columns are the same for one input, the 2:1 mux at the input can be omitted. Since each stage represents a 4:2 CSA compression, an internal carry signal passes between neighboring bits in the same stage. The carry out of the bit 8 cell of each stage is connected back to the bit 0 cell in the case of the multiplier mode and is muxed with the normal carry input at that stage for the despread mode. The bottom rows in FIG. 5 show the final partial products that are added together by the carry propagate adder.

Each bit of carry save adders 300, 302 and 304 is illustrated separately as a single bit cell. For example, bit 7 of carry save adder 300 is illustrated as cell 320 in FIG. 5. Within each cell, the partial products combined in the multiplier mode are shown in the right column and the partial products combined in the despread mode are shown in the left column. Thus, by way of example, cell 320 of carry save adder 300 combines partial products a7b0, a6b1, a5b2 and a4b3 in the multiplier mode. In the despread mode, cell 320 combines partial products a7b0, a7b1, a7b2 and a7b3. Cell 324 at bit 7 of carry save adder 304 combines outputs s7_0 and c6_0 of carry save adder 300 and outputs s7_1 and c6_1 of carry save adder 302 to provide outputs s7-2 and c6_2 to carry save adder 210 (FIG. 4).

A partial circuit diagram of the carry save adder array represented by FIG. 5 is shown in FIG. 6. As noted above, CSA 300, CSA 302 and CSA 304 are each made up of carry save adder cells, with one cell corresponding to each bit of the partial product vector. Referring to FIGS. 5 and 6, cell 320 at bit 7 and cell 330 at bit 6 of CSA 300 are shown in FIG. 6. In addition, cell 322 at bit 7 and cell 332 at bit 6 of CSA 302, and cell 324 at bit 7 and cell 334 at bit 6 of CSA 304 are shown in FIG. 6. Each cell includes two full adders (FA) 340 in a conventional carry save adder configuration. The multiplexer 130 (FIG. 3), which includes an array of 2:1 muxes controlled by the operating mode, selects either the multiplier partial products (right column of each cell) or the despread partial products (left column of each cell) as inputs to each cell of CSA 300 and CSA 302. The partial product inputs to cells 320, 322, 330 and 332 correspond to the multiplier mode inputs shown in FIG. 5 for the respective cells. The cells are connected to provide an 8:2 compression of the inputs. In the despread mode, the multiplexer 130 provides the inputs shown in the left columns of FIG. 5 to the inputs of the respective cells.

Figure 7:
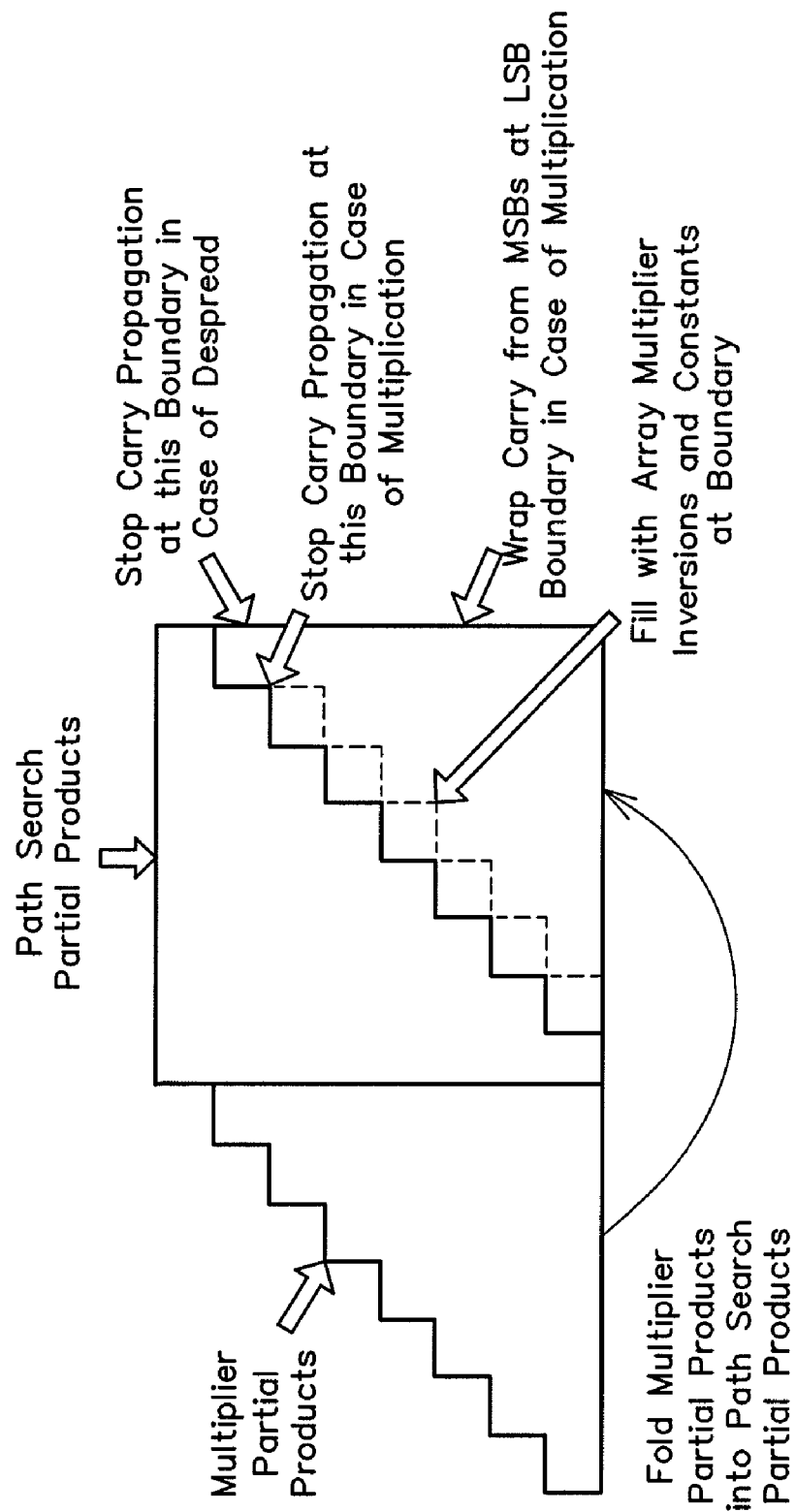
FIG. 7 is a schematic diagram that illustrates folding of higher order bits of partial products in the carry save adder array.

The operation of the multiplication engine is shown schematically in FIG. 7. The high order multiplier partial products, which correspond to the left side of FIG. 3A, are folded into the path search partial products, which correspond to the partial products shown in FIG. 3B. This permits multiplication to be performed in the multiplier mode and in the despread mode.

Multiplication Overview:

In binary multiplication of signed fixed point numbers, each bit of a multiplier and multiplicand are ANDed together to produce a set partial products. The partial products are then added together to produce the final product. The section below shows a description of the multiplication of two numbers, A and B, of binary width M and N.

We describe the multiplicand and multiplier as:

$$A = -a_{M-1}2^{M-1} + a_{M-2}2^{M-2} + a_{M-3}2^{M-3} + a_{M-4}2^{M-4} + a_{M-5}2^{M-5} + a_{M-6}2^{M-6} + a_{M-7}2^{M-7} \ldots a_0 2^0$$

$$B = -b_{N-1}2^{N-1} + b_{N-2}2^{N-2} + b_{N-3}2^{N-3} + b_{N-4}2^{N-4} + b_{N-5}2^{N-5} + b_{N-6}2^{N-6} + b_{N-7}2^{N-7} \ldots b_0 2^0$$

It can then be shown that the complete product for signed multiplication is given by:

$$P = a_{M-1}b_{N-1}2^{M+N-2} + \sum_{i=0}^{M-2}\sum_{j=0}^{N-2} a_i b_j 2^{i+j} +$$

$$2^{M-1}\left(-2^N + 2^{N-1} + \overline{a}_{M-1}2^{N-1} + a_{M-1} + \sum_{i=0}^{N-2} a_{M-1}\overline{b}_i 2^i\right) +$$

$$2^{N-1}\left(-2^M + 2^{M-1} + \overline{b}_{N-1}2^{M-1} + b_{N-1} + \sum_{i=0}^{M-2} \overline{a}_i b_{N-1} 2^i\right)$$

The graphical representation of the multiplier described above is seen below.

To minimize propagation delay through the array multiplier, the partial products are generally compressed into two partial product vectors using the carry save adders. For an N by M multiplication, the worst case critical summation has M+N+2 bits to compress. As an example, consider an 8*8 multiplication, which generates 64 partial products. To compress these partial products into two 16-bit vectors, approximately 25 carry save adders are needed, when using a tree type compression technique. The final product is then produced using a standard carry propagate adder, which can be constructed using one of many different topologies, including carry ripple, carry select, carry-skip, Ling, or Han-Carlsen.

Despreading Overview:

A number of applications in the field of spread spectrum communications utilize the functions of spreading and despreading. At the receiver side, despreading is used to recover the original symbol from the received signal by despreading the signal. Despreading involves computing samples of a correlation between complex input data and a precomputed complex spreading/scrambling code sequence. The input data consists of samples with 8-bit real and imaginary parts. The code sequence samples, on the other hand, are always members of {1+j, −1+j, −1−j, 1−j}, and are therefore specified by 1-bit real and imaginary parts.

The D7-D0 data inputs are 16-bit complex numbers and the B7-B0 code inputs are 2-bit complex numbers. In this way, eight 16-bit complex numbers are multiplied together with eight 2-bit complex numbers, the results are added together and then added to the content in an accumulator register. Note that since the complex code coefficient, B, are 2-bit complex numbers, the multiplications shown are produced by simply ANDing the code coefficient with all the bits in the 8-bit data word. This is equivalent to a regular multiplier with a single bit multiplicand. Compared to regular multiplier there is the added complexity of having to add together 8 different partial products for both the imaginary and real accumulator result.

The partial products generated in the 8-bit multiplication and how the final sum is constructed are illustrated below. The number of bits in the final sum depends on the number of partial products being added together and will have $2^M + \log_2 N$ bits.

$$a_{M-1}\overline{b}_0 \quad \cdots \quad a_3 b_0 \quad a_2 b_0 \quad a_1 b_0 \quad a_0 b_0$$
$$a_{M-1}\overline{b}_1 \quad \cdots \quad a_3 b_1 \quad a_2 b_1 \quad a_1 b_1 \quad a_0 b_1$$
$$a_{M-1}\overline{b}_2 \quad \cdots \quad a_3 b_2 \quad a_2 b_2 \quad a_1 b_2 \quad a_0 b_2$$

$$
\begin{array}{c}
b_{M-1} \\
a_{M-1} \\
a_{M-1}\overline{b}_0 \quad \cdots \quad a_3 b_0 \quad a_2 b_0 \quad a_1 b_0 \quad a_0 b_0 \\
a_{M-1}\overline{b}_1 \quad \cdots \quad a_3 b_1 \quad a_2 b_1 \quad a_1 b_1 \quad a_0 b_1 \\
a_{M-1}\overline{b}_2 \quad \cdots \quad a_3 b_2 \quad a_2 b_2 \quad a_1 b_2 \quad a_0 b_2 \\
a_{M-1}\overline{b}_3 \quad \cdots \quad a_3 b_3 \quad a_2 b_3 \quad a_1 b_3 \quad a_0 b_3 \\
\overline{a}_{N-1} \\
+1 \quad \overline{b}_{N-1} \\
\hline
2^{M+N+1} \quad 2^{M+N} \quad 2^{M+N-1} \quad \cdots \quad 2^6 \quad 2^5 \quad 2^4 \quad 2^3 \quad 2^2 \quad 2^1 \quad 2^0
\end{array}
$$

-continued

| + | | $a_{M-1}\bar{b}_3$ | ⋯ | $a_3b_3$ | $a_2b_3$ | $a_1b_3$ | $a_0b_3$ |
|---|---|---|---|---|---|---|---|
| ⋯ | $2^{M+1}$ $2^M$ | $2^{M-1}$ | ⋯ | $2^3$ | $2^2$ | $2^1$ | $2^0$ |

For the compression of 8 partial products into 2 partial products, a total of 24 4:2 carry save adders is needed.

Hardware Combination:

As demonstrated, the multiplier and the despread operations share a great deal of functionality. The challenge is to combine the hardware in one coherent unit that can accommodate both functions without adding significant hardware. Although the concept of the hardware optimization described can be generally applied, consider an example combining the hardware of a 16-bit complex multiplier and a 16-bit complex despread function. The 16-bit complex multiplier would need 4 separate signed 8×8 multipliers. These multiplications would be produced in carry save format and then added together based on the complex math. For example, consider the multiplication below between numbers A and B to produce P:

$$A = A_{RE} + A_{IM}i$$

$$B = B_{RE} + B_{IM}i$$

$$P = B_{RE}A_{RE} - A_{IM}B_{IM} + (B_{IM}A_{RE} + A_{IM}B_{RE})i$$

The circuit shown in FIG. 4 is duplicated for the imaginary part of the complex multiplication. The subtraction needed in the real datapath for both the despread function and the general purpose signed multiplication is handled by inverting the partial products and adding a one at the LSB at the stage of the carry save adder 220. In order for the circuit to work correctly, the carry save array 140 is manipulated as shown in FIG. 5 and described above.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A multiplication engine for a digital processor, the multiplication engine comprising:
   a first partial-product generation circuit to generate a first set of unequally weighted partial products from a set of input operands;
   a second partial-product generation circuit to generate a second set of equally weighted partial products from the set of input operands;
   a multiplexer to select the first set of unequally weighted partial products or the second set of equally weighted partial products in accordance with first and second multiplier modes, respectively; and
   a carry save adder array configured to add the selected set of partial products,
   wherein, in the first multiplier mode, the carry-save adder array folds over higher-order bits of the first set of unequally weighted partial products into lower-order slots in the carry-save adder array, thereby allowing the same carry-save adder array to be used in either the first or the second multiplier modes.

2. A multiplication engine as defined in claim 1, further comprising a carry propagate adder configured to combine a current result of the carry save adder array and a previous result to provide a new result for saving in an accumulation register.

3. A multiplication engine as defined in claim 2, wherein the carry save adder array comprises a plurality of carry save adder elements and wherein one or more of the carry save adder elements are used to combine partial products in both the first multiplier mode and in the second multiplier mode.

4. A multiplication engine as defined in claim 2, wherein the carry save adder array comprises a first carry save adder configured to combine a first subset of partial products in the first and second multiplier modes, a second carry save adder configured to combine a second subset of partial products in the first and second multiplier modes and a third carry save adder configured to combine outputs of the first and second carry save adders in the first and second multiplier modes.

5. A multiplication engine as defined in claim 4, wherein the first, second and third carry save adders include carry save adder cells, one or more of which are used to combine partial products in the first and second multiplier modes.

6. A multiplication engine as defined in claim 2, wherein the first multiplier mode comprises a general purpose multiplier mode and wherein the second multiplier mode comprises a despread mode.

7. A multiplication engine as defined in claim 2, configured to perform multiplication of complex numbers.

8. A multiplication engine as defined in claim 1, wherein the first and second multipliers each comprise an array of AND gates to combine bits of first and second operands and to produce partial products.

9. A multiplication engine as defined in claim 2, configured to multiply two 16-bit complex values in the first multiplier mode and to multiply 16-bit complex data values by 2-bit complex coefficients in the second multiplier mode.

10. A multiplication engine as defined in claim 2, wherein the carry propagate adder is used in the first multiplier mode and in the second multiplier mode.

11. A method for multiplication in a digital processor, comprising:
   generating a first set of unequally weighted partial products from a set of input operands;
   generating a second set of equally weighted partial products from the set of input operands;
   selecting the first set of unequally weighted partial products when operating in a first multiplier mode or selecting the second set of equally weighted partial products when operating in a second multiplier mode;
   folding over, in the carry-save adder array, higher-order bits of the first set of unequally weighted partial products into lower-order slots in the carry-save adder array when operating in the first multiplier mode, thereby allowing the carry-save adder array to be used in the first and second multiplier modes; and
   adding the selected set of partial products in a carry save adder array comprising digital logic circuitry.

12. A method as defined in claim 11, further comprising combining a current result produced by the carry save adder array with a previous result held in an accumulation register to produce a new result.

13. A method as defined in claim 11, wherein combining the selected partial products comprises using one or more elements of the carry save adder array to combine the selected partial products in the first multiplier mode and in the second multiplier mode.

14. A method as defined in claim 11, wherein the first multiplier mode comprises a general purpose multiplier mode and wherein the second multiplier mode comprises a despread mode.

15. A method as defined in claim 11, configured to perform multiplication of complex numbers.

16. A multiplication engine as defined in claim 1 further comprising propagation-disabling multiplexers configured to cut carry paths in the carry-save adder array based on the multiplier mode.

17. A multiplication engine as defined in claim 1, wherein subtraction in a real datapath of the multiplier engine is accomplished by inverting partial products and adding a 1 at the least significant bit at a stage of the carry-save adder.

18. A method as defined in claim 11, further comprising cutting carry paths in the carry-save adder array, based on the multiplier mode, using propagation-disabling multiplexers.

19. A method as defined in claim 11, further comprising performing a subtraction in a real datapath of the multiplication engine by inverting partial products and adding a 1 at the least significant bit at a stage of the carry-save adder.

* * * * *